(12) United States Patent
Saka et al.

(10) Patent No.: US 7,697,175 B2
(45) Date of Patent: Apr. 13, 2010

(54) IMAGE READING APPARATUS CAPABLE OF DETECTING NOISE

(75) Inventors: Masaaki Saka, Toyokawa (JP); Kazuhiro Ishiguro, Toyohashi (JP); Takayuki Nabeshima, Toyokawa (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 949 days.

(21) Appl. No.: 11/019,712

(22) Filed: Dec. 23, 2004

(65) Prior Publication Data

US 2006/0066919 A1    Mar. 30, 2006

(30) Foreign Application Priority Data

Sep. 30, 2004  (JP) ............................. 2004-286214

(51) Int. Cl.
 *H04N 1/46* (2006.01)
(52) U.S. Cl. .................................... 358/514; 358/515
(58) Field of Classification Search ................ 358/463, 358/464, 466, 515, 3.27, 529, 514; 382/275, 382/266, 199, 261
See application file for complete search history.

(56) References Cited

U.S. PATENT DOCUMENTS

| | | | |
|---|---|---|---|
| 4,980,760 A | | 12/1990 | Hiratsuka et al. |
| 5,317,420 A | * | 5/1994 | Kuwahara .................... 358/463 |
| 5,850,293 A | * | 12/1998 | Suzuki et al. ............... 358/3.27 |
| 5,982,946 A | | 11/1999 | Murakami |
| 6,125,213 A | | 9/2000 | Morimoto |
| 6,215,512 B1 | * | 4/2001 | Imaizumi et al. ............ 347/234 |
| 6,323,959 B1 | | 11/2001 | Toyama et al. |
| 6,441,915 B1 | | 8/2002 | Imaizumi et al. |
| 6,625,331 B1 | | 9/2003 | Imaizumi et al. |
| 6,631,207 B2 | | 10/2003 | Hirota et al. |
| 6,728,418 B1 | | 4/2004 | Kumagai et al. |
| 6,778,297 B1 | | 8/2004 | Fujiwara |

(Continued)

FOREIGN PATENT DOCUMENTS

EP    0270090    9/1993

(Continued)

OTHER PUBLICATIONS

U.S. Appl. No. 11/012,184, filed Dec. 16, 2004, Ishiguro et al.

(Continued)

*Primary Examiner*—Douglas Q Tran
(74) *Attorney, Agent, or Firm*—Morrison & Foerster LLP

(57) ABSTRACT

An image reading apparatus includes: three line sensors having filters, respectively, different in spectral sensitivity, and arranged in a subscanning direction with a distance therebetween to scan an original in the subscanning direction; a platen arranged between the original and the three line sensors; a mover moving the platen at a rate relative to the three line sensors, the rate being different from that of the original relative to the three line sensors; a noise pixel detection processor detecting a noise pixel from each of the three data output from the three line sensors; a color detector detecting a color of each noise pixel from the three data; and a determiner validating a result of detection by the noise pixel detection processor when a color of the noise pixel and that of a pixel neighboring the noise pixel form a predetermined combination.

11 Claims, 14 Drawing Sheets

U.S. PATENT DOCUMENTS

| | | | |
|---|---|---|---|
| 6,806,902 | B1 | 10/2004 | Donovan |
| 7,046,861 | B2 | 5/2006 | Imaizumi et al. |
| 7,072,075 | B2 * | 7/2006 | Kondo et al. ............. 358/1.9 |
| 7,079,685 | B1 | 7/2006 | Hirota et al. |
| 7,283,164 | B2 * | 10/2007 | Kakarala et al. ........... 348/246 |
| 7,382,406 | B2 | 6/2008 | Higuchi |
| 2001/0026380 | A1 * | 10/2001 | Imoto ..................... 358/496 |
| 2002/0136463 | A1 | 9/2002 | Akahori et al. |
| 2006/0066915 | A1 | 3/2006 | Saka et al. |
| 2006/0066916 | A1 | 3/2006 | Ishiguro et al. |
| 2006/0066917 | A1 | 3/2006 | Ishiguro et al. |
| 2006/0066918 | A1 | 3/2006 | Ishiguro et al. |
| 2006/0066920 | A1 | 3/2006 | Saka et al. |
| 2006/0066921 | A1 | 3/2006 | Saka et al. |
| 2006/0072169 | A1 | 4/2006 | Ishiguro et al. |
| 2006/0072826 | A1 | 4/2006 | Ishiguro et al. |
| 2006/0098248 | A1 | 5/2006 | Suzuki et al. |

FOREIGN PATENT DOCUMENTS

| | | |
|---|---|---|
| JP | 63-141455 | 6/1988 |
| JP | 1-309467 | 12/1989 |
| JP | 05-324812 | 12/1993 |
| JP | 9-139844 | 5/1997 |
| JP | 10-228536 | 8/1998 |
| JP | 11-266373 | 9/1999 |
| JP | 2000-278485 | 10/2000 |
| JP | 2000-287031 A | 10/2000 |
| JP | 2000-324312 | 11/2000 |
| JP | 2001-103249 | 4/2001 |
| JP | 2001-272829 | 10/2001 |
| JP | 2002-77584 | 3/2002 |
| JP | 2002-185767 | 6/2002 |
| JP | 2002-271631 | 9/2002 |
| JP | 2002-354262 | 12/2002 |
| JP | 2003-8846 | 1/2003 |
| JP | 2003-259096 | 9/2003 |
| JP | 2003-315933 | 11/2003 |
| JP | 2004-112611 | 4/2004 |
| JP | 2004-112645 | 4/2004 |

OTHER PUBLICATIONS

U.S. Appl. No. 11/012,231, filed Dec. 16, 2004, Ishiguro et al.
U.S. Appl. No. 11/017,662, filed Dec. 22, 2004, Ishiguro et al.
U.S. Appl. No. 11/019,520, filed Dec. 23, 2004, Ishiguro et al.
U.S. Appl. No. 11/019,181, filed Dec. 23, 2004, Ishiguro et al.
U.S. Appl. No. 11/020,209, filed Dec. 27, 2004, Saka et al.
U.S. Appl. No. 11/020,232, filed Dec. 27, 2004, Suzuki et al.
U.S. Appl. No. 11/020,233, filed Dec. 27, 2004, Saka et al.
U.S. Appl. No. 11/020,479, filed Dec. 27, 2004, Saka et al.
Japanese Office Action mailed on Oct. 28, 2008 directed towards foreign application No. 2004-286214; 4 pages.
Japanese Notice of Grounds of Rejection, mailed on Feb. 10, 2009, directed to Japanese Patent Application No. 2004-326869; 4 pages.
Ishiguro et al., U.S. Office Action, mailed Sep. 18, 2008, directed to U.S. Appl. No. 11/012,184; 26 pages.
Ishiguro et al., U.S. Office Action, mailed Apr. 10, 2009, directed to U.S. Appl. No. 11/012,184; 15 pages.
Ishiguro et al., U.S. Office Action, mailed May 12, 2008, directed to U.S. Appl. No. 11/012,231; 37 pages.
Ishiguro et al., U.S. Office Action, mailed Nov. 20, 2008, directed to U.S. Appl. No. 11/012,231; 31 pages.
Ishiguro et al., U.S. Office Action, mailed Oct. 25, 2007, directed to U.S. Appl. No. 11/019,520; 11 pages.
Ishiguro et al., U.S. Office Action, mailed Sep. 12, 2008, directed to U.S. Appl. No. 11/017,662; 31 pages.
Ishiguro et al., U.S. Office Action, mailed Apr. 24, 2009, directed to U.S. Appl. No. 11/017,662; 27 pages.
Ishiguro et al., U.S. Office Action, mailed Sep. 23, 2008, directed to U.S. Appl. No. 11/019,181; 26 pages.
Ishiguro et al., U.S. Office Action, mailed Apr. 13, 2009, directed to U.S. Appl. No. 11/019,181; 16 pages.
Saka et al., U.S. Office Action, mailed Jul. 3, 2008, directed to U.S. Appl. No. 11/020,209; 39 pages.
Saka et al., U.S. Office Action, mailed Jan. 27, 2009, directed to U.S. Appl. No. 11/020,209; 31 pages.
Suzuki et al., U.S. Office Action, mailed May 23, 2008, directed to U.S. Appl. No. 11/020,232; 24 pages.
Suzuki et al., U.S. Office Action, mailed Nov. 13, 2008, directed to U.S. Appl. No. 11/020,232; 25 pages.
Suzuki et al., U.S. Office Action, mailed May 18, 2009, directed to U.S. Appl. No. 11/020,232; 25 pages.
Saka et al., U.S. Office Action, mailed Jul. 2, 2008, directed to U.S. Appl. No. 11/020,479; 37 pages.
Saka et al., U.S. Office Action, mailed Jan. 22, 2009, directed to U.S. Appl. No. 11/020,479; 32 pages.
Saka et al., U.S. Office Action, mailed May 14, 2009, directed to U.S. Appl. No. 11/020,479; 35 pages.
Saka et al., U.S. Office Action, mailed Jun. 29, 2009, directed to U.S. Appl. No. 11/020,209; 31 pages.
Ishiguro et al., U.S. Office Action, mailed Jun. 26, 2009, directed to U.S. Appl. No. 11/012,231; 8 pages.
Japanese Office Action mailed on Oct. 28, 2008 directed towards foreign application no. 2004-286214; 4 pages.

* cited by examiner

F I G. 1
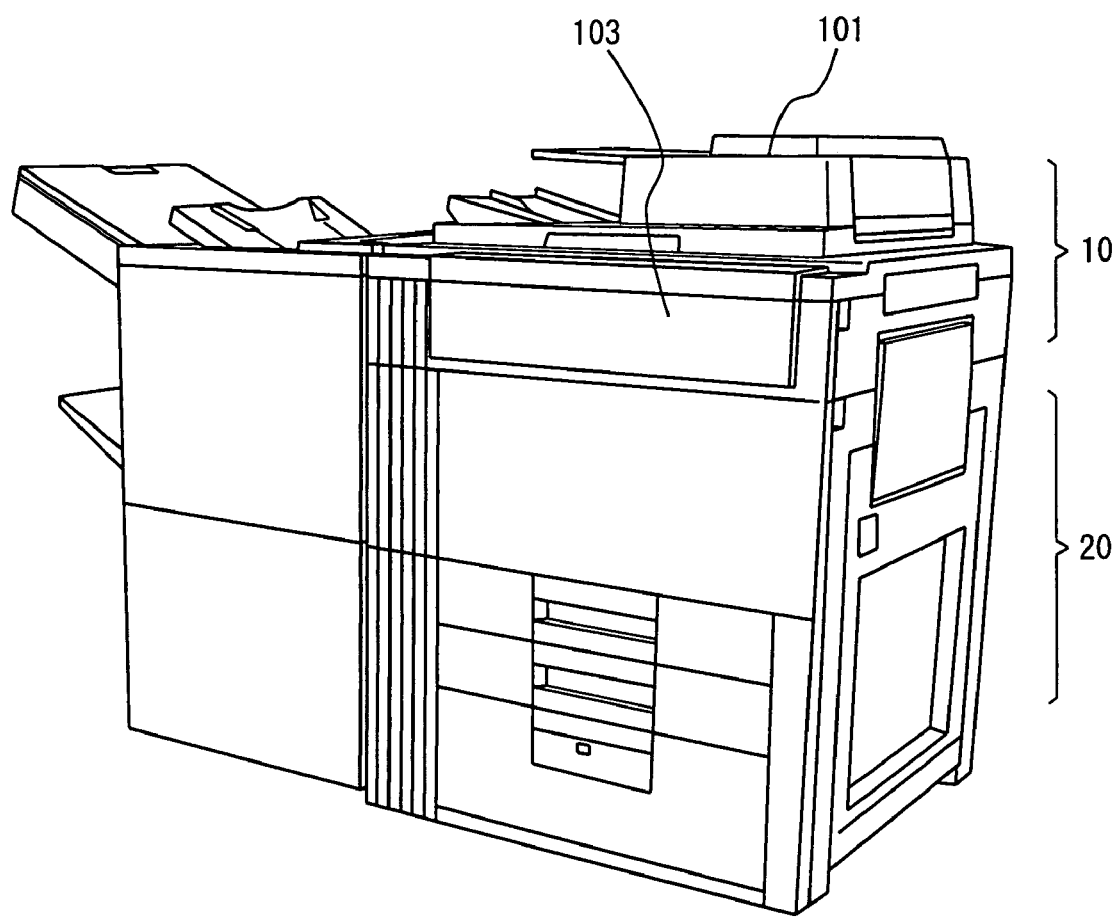

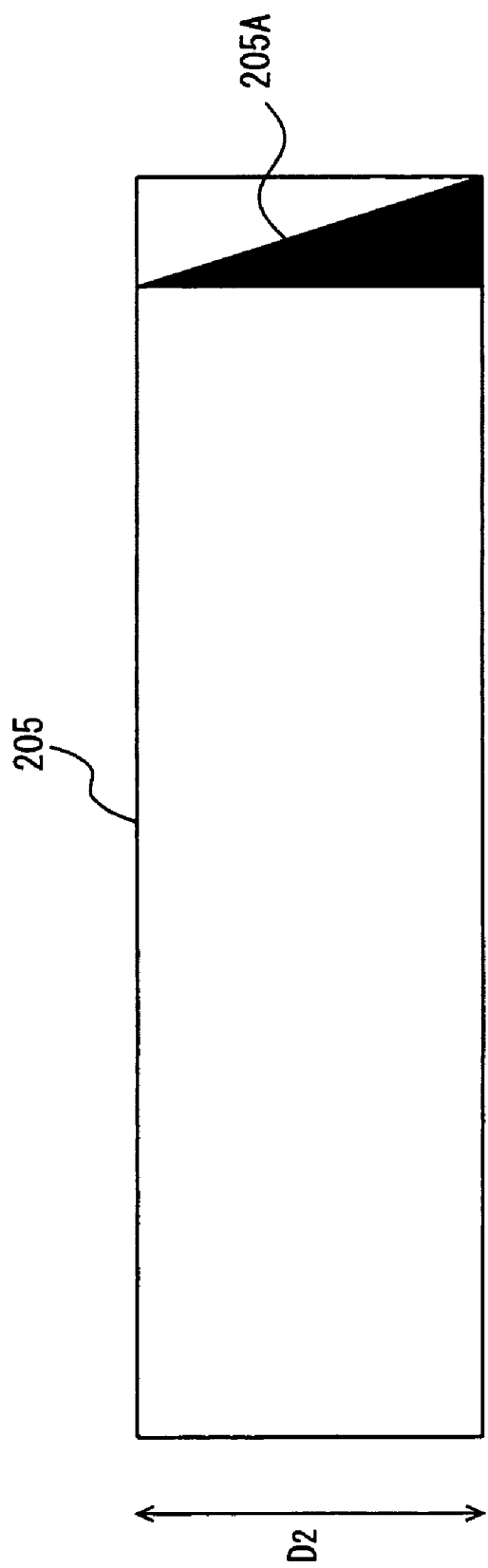

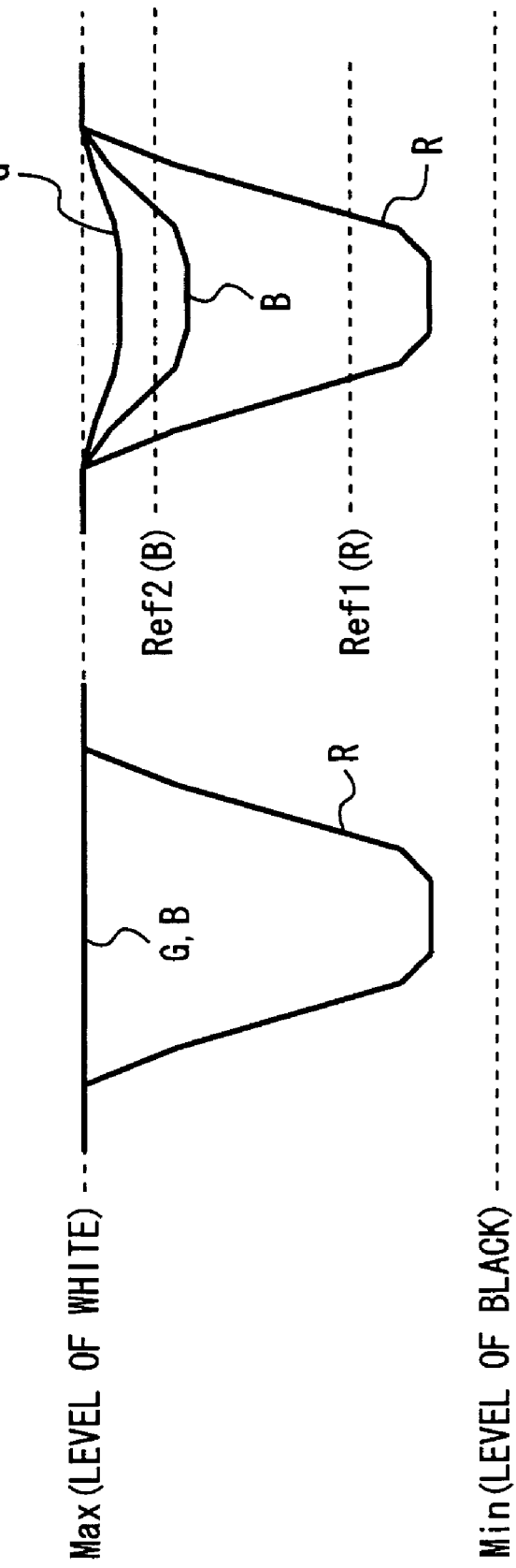

FIG. 13

| BACKGROUND COLOR | WHITE DUST | | | BLACK DUST | | |
|---|---|---|---|---|---|---|
| | R SIGNAL | G SIGNAL | B SIGNAL | R SIGNAL | G SIGNAL | B SIGNAL |
| R | - | Y | M | K | - | - |
| G | Y | - | C | - | K | - |
| B | M | C | - | - | - | K |
| Y | - | - | W | G | R | - |
| M | - | W | - | B | - | R |
| C | W | - | - | - | B | G | ns
IMAGE READING APPARATUS CAPABLE OF DETECTING NOISE

This application is based on Japanese Patent Application No. 2004-286214 filed with the Japan Patent Office on Sep. 30, 2004, the entire content of which is hereby incorporated by reference.

BACKGROUND OF THE INVENTION

1. Field of the Invention

The present invention relates generally to image reading apparatuses and particularly to image reading apparatuses reading an original while transporting it.

2. Description of Related Art

Conventionally digital copiers and similar image reading apparatuses employ a technique referred to as so-called "reading an original while passing the original." More specifically, an original is transported relative to a fixed line sensor in a sub scanning direction orthogonal to the line sensor as the original is read.

Such image reading apparatus is provided with a transparent platen between the original and the line sensor to fix a position at which a transported original is read. The original reflects light which is in turn received via the platen by the line sensor.

As such, if dust, paper particles, flaws or other similar foreign matters (hereinafter generally referred to as "dust") adhered on the platen's reading position, the line sensor will read the dust while reading a transported original. This provides an output image with noise in the form of a line in the sub scanning direction.

Japanese Laid-Open Patent publication No. 2000-278485 describes an image reading apparatus that detects noise caused by dust adhering on a platen glass's reading position from a read image by oscillating the platen in a main scanning direction as the apparatus reads an original. This image reading apparatus detects a specific waveform appearing in an image as noise generated by reading dust.

The image reading apparatus described in Japanese Laid-Open Patent publication No. 2000-278485, however, employs pattern-matching to detect the specific waveform appearing in an image. As such, if an original includes such a pattern, the apparatus would erroneously detect the pattern.

SUMMARY OF THE INVENTION

The present invention has been made to overcome the above disadvantage and contemplates an image reading apparatus capable of detecting with improved precision noise generated in an image by dust existing on a platen.

To achieve the above object the present invention in one aspect provides an image reading apparatus including: at least three line sensors having filters, respectively, different in spectral sensitivity, and arranged in a subscanning direction with a distance therebetween to scan an original in the subscanning direction; a platen arranged between the original and the line sensors; a mover moving the platen at a rate relative to the line sensors, the rate being different from that of the original relative to the line sensors; a noise pixel detector detecting a noise pixel from each of at least three data output from the line sensors; a color detector detecting a color of each noise pixel from the data; and a determiner validating a result of detection for a noise pixel by the noise pixel detector when a color of the noise pixel and that of a pixel neighboring the noise pixel form a predetermined combination.

In accordance with the present invention an original is scanned in a sub scanning direction by at least three line sensors having filters, respectively, different in spectral sensitivity, and arranged in the subscanning direction with a distance therebetween and between the original and the line sensors there is provided a platen moving at a rate relative to the line sensors, the rate being different from that of the original relative to the line sensors. When the platen has dust adhering thereon, the dust is read by the line sensors sequentially. As the platen is moved at a rate relative to the line sensors, the rate being different from that of the original relative to the line sensors, the dust on the platen is read by each line sensor at a different location on the original. The apparatus detects a noise pixel from each of at least three data output from the line sensors and validates a result of detection as a noise pixel when a color of the noise pixel and that of a pixel neighboring the noise pixel form a predetermined combination.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a perspective view of an MFP including an image reading apparatus in one embodiment of the present invention.

FIG. 5 is a rear plan view of the platen.

FIGS. 10A and 10B show one example of RGB signal output from a reader.

FIG. 13 shows one example of a decision table referenced by a determiner.

DESCRIPTION OF THE PREFERRED EMBODIMENTS

Figure 2:
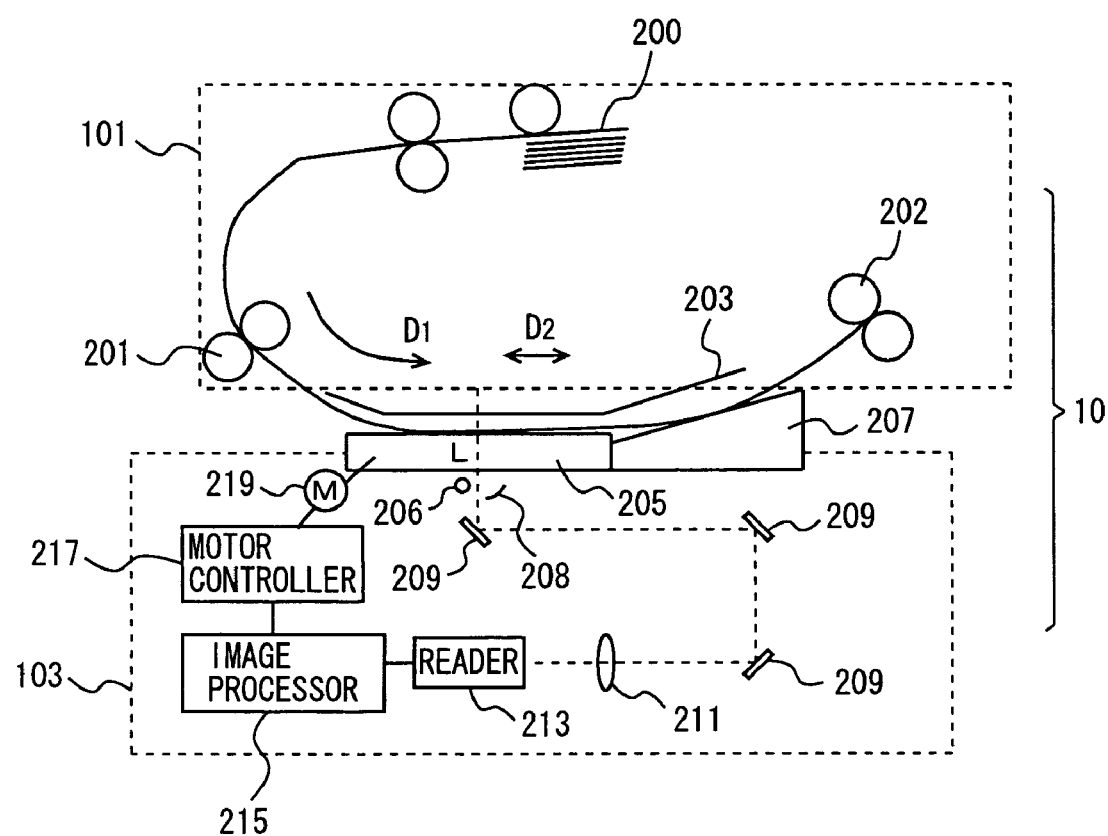
FIG. 2 schematically shows the image reading apparatus's internal structure.

Hereinafter reference will be made to the drawings to describe embodiments of the present invention. In the following description, like components are denoted by like reference characters and also identical in name and function.

FIG. 1 is a perspective view of a multi-function peripheral (MFP) including an image reading apparatus in one embodiment of the present invention. With reference to the figure, the MFP includes an image reading apparatus 10 operative to read an original image, and an image forming apparatus 20 provided under image reading apparatus 10. The MFP forms an image read by image reading apparatus 10 on a sheet of paper or similar recording medium. Furthermore, the MFP includes a communications interface to connect with a facsimile device, a local area network (LAN), a public line or similar network.

FIG. 2 schematically shows an internal configuration of image reading apparatus 10. Image reading apparatus 10 includes an automatic document feeder (ADF) 101 and a main body 103. ADF 101 includes an upper restraint plate 203 guiding a transported original in the vicinity of an original reading position, a timing roller pair 201 transporting the original to the original reading position, and a roller pair 202 transporting the original having moved past the reading position.

Main body 103 includes a platen 205 formed of a transparent member, a sheet passage guide 207 forming a portion of a path of the original, a source of light 206 illuminating the original at the reading position, a reflector member 208 reflecting the light emitted from the source of light, a reader 213 having three line sensors arranged in a sub scanning direction, a reflector mirror 209 arranged to reflect light reflected from the original and guide the reflection of light to reader 213, a lens 211 focusing the reflection of light on reader 213, an image processor 215 processing an electrical signal output from reader 213, a motor 219 operative to oscillate platen 205, and a motor controller 217 operative in response to a control signal received from image processor 215 to control the driving of motor 219.

An original 200 is transported by timing roller pair 201 between platen 205 and upper restraint plate 203 in a direction D1. The original being transported has its image read at a reading position L by reader 213 successively. ADF 101 transports an original in the sub scanning direction, as seen at a reading position L. During the image reading operation, platen 205 is oscillated by motor 219 in a direction D2. Platen 205 oscillates in a direction substantially parallel to the sub scanning direction.

Reader 213 includes three line sensors each having a plurality of photoelectric conversion elements arranged in a main scanning direction substantially perpendicular to the sub scanning direction. The three line sensors have filters, respectively, different in spectral sensitivity and receive light reflected from an original through the filters. More specifically, the sensors have filters transmitting light of waveforms of red (R), green (G) and blue (B). Thus, the line sensor having the filter of red (R) outputs an R signal, an electrical signal indicating an intensity of red light of light reflected from an original, the line sensor having the filter of green (G) outputs a G signal, an electrical signal indicating an intensity of green light of light reflected from the original, and the line sensor having the filter of blue (B) outputs a B signal, an electrical signal indicating an intensity of blue light of light reflected from the original.

The three line sensors are arranged in the sub scanning direction in a predetermined order with a predetermined distance therebetween. In this example, the line sensors are spaced by a distance corresponding to three original reading lines, and arranged, red first, followed by green and then blue as seen in the direction in which an original is transported, although the line sensors may be spaced by different distances and arranged in different orders.

The three line sensors thus spaced and arranged simultaneously receive at the same timing the light reflected by an original at different locations. As such, the light reflected by the original at a location is initially received by the red light receiving line sensor, subsequently by the green light receiving line sensor, and finally by the blue light receiving line sensor. This delay is adjusted by image processor 215, as will be described later.

Note that while in the present embodiment reader 213 is provided with three line sensors, it may be provided with four or more line sensors.

Figure 3:
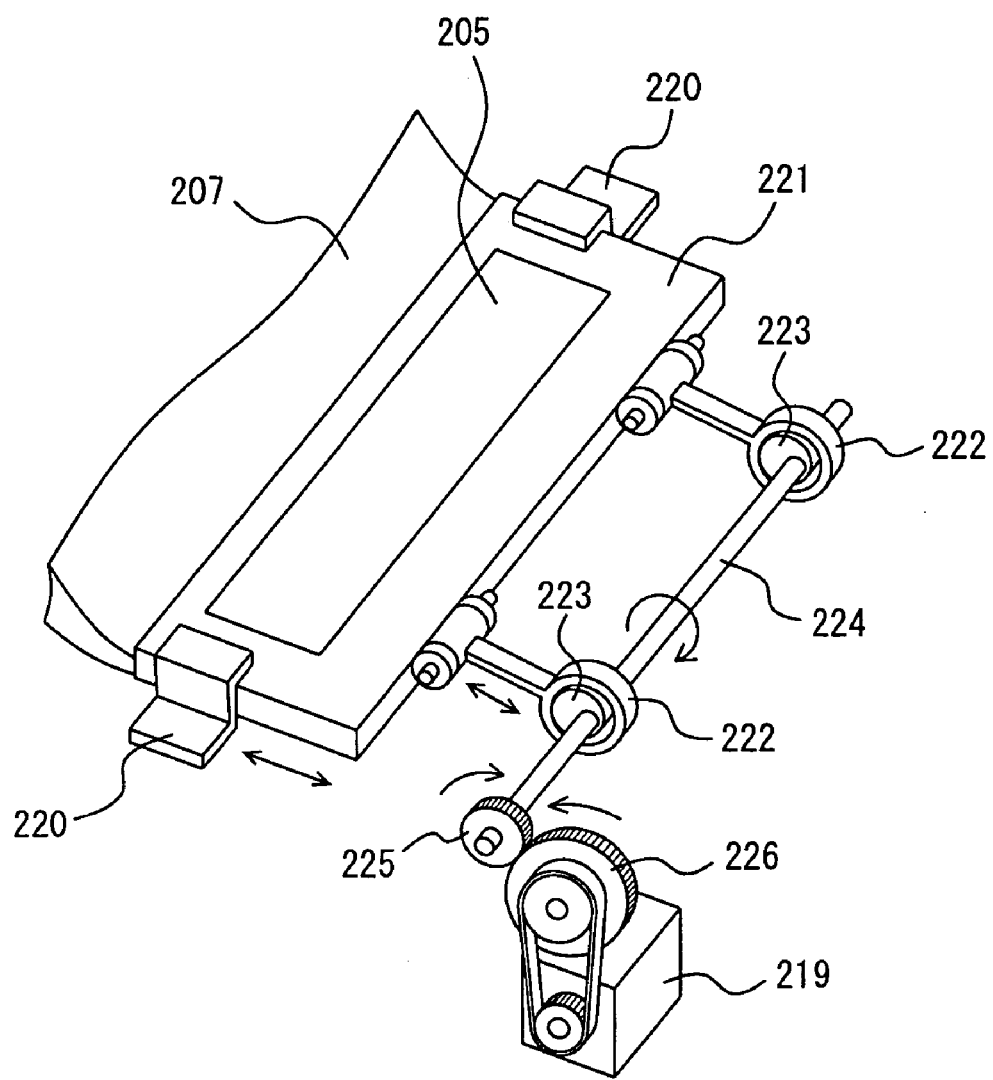
FIG. 3 is a perspective view of a mechanism employed to oscillate a platen.

FIG. 3 is a perspective view showing a mechanism employed to oscillate the platen. With reference to the figure, platen 205 is held by a platen holder 221 held slidably in the sub scanning direction by a guide 220 fixed to the main body of image reading apparatus 10. Platen holder 221 has one surface with two arms 222 connected thereto. Arm 222 has the other end provided with a circular hole.

A shaft 224 at portions corresponding to the two arms 222 has two cams 223 attached thereto. Furthermore, shaft 224 has one end with a gear 225 attached thereto. Gear 225 is arranged to mesh with a gear 226 linked by a belt to the motor 219 drive shaft. As motor 219 runs, the motor's rotation is transmitted by the belt to gear 226, and gear 226 thus rotates. As gear 226 rotates, gear 225 and shaft 224 rotate.

Cam 223 is arranged in the circular hole of arm 222. As such, as shaft 224 rotates, the two cams 223 accordingly provide rotation, which is converted to translation movement of platen holder 221.

Note that platen 205 may be oscillated by a mechanism other than that described above. For example, the platen may be oscillated by a mechanism employing a driving source, such as a piston utilizing an electromagnet, air pressure, hydraulic pressure and the like, causing linear movement.

Platen 205 is oscillated parallel to the sub scanning direction. When platen 205 is moving in a direction opposite that in which an original is transported, platen 205 and the original move in the opposite directions. As such, the speed of platen 205 relative to line sensors 213R, 213G, 213B and that of the original relative to the line sensors are different. In contrast, when platen 205 is moving in the direction in which the original is transported, the speed of platen 205 and that of the original transported are the same in direction. Preferably, they should be different in rate. Note that while herein platen 205 is oscillated parallel to the sub scanning direction, the platen may be oscillated in different directions.

Figure 4A:
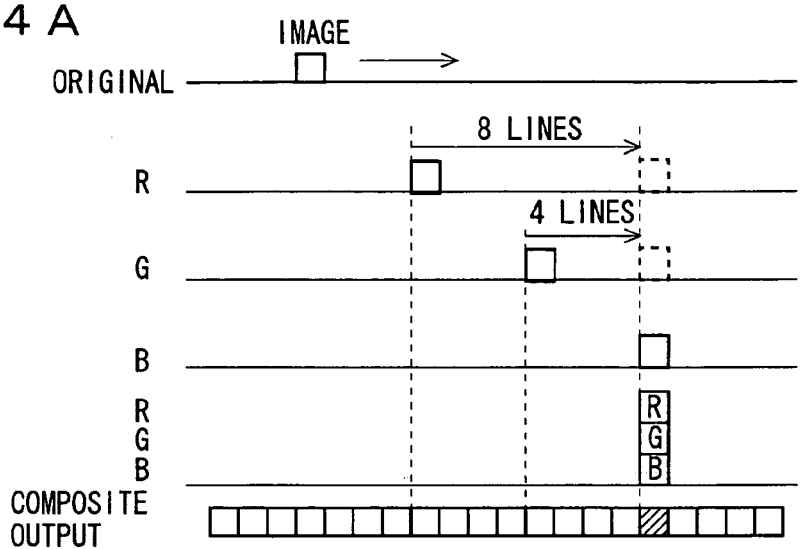
FIGS. 4A-4C are diagrams for illustrating a theory of detecting noise generated by reading dust from a read image.
Figure 4B:
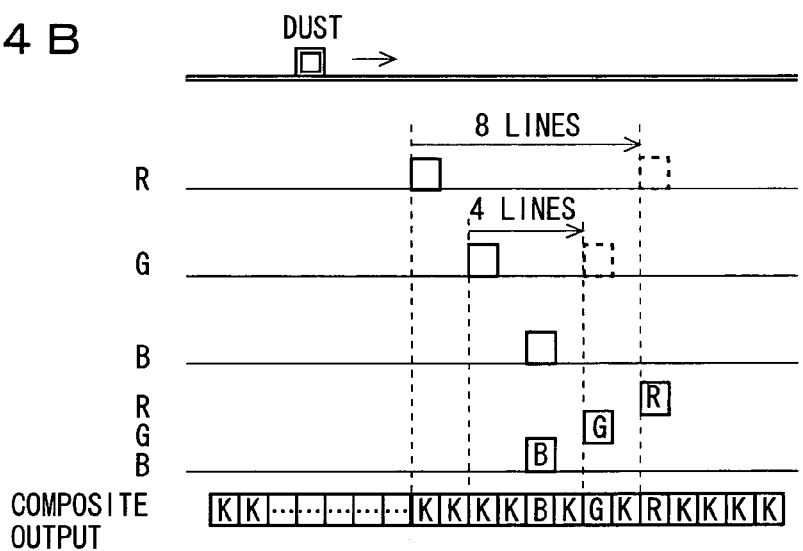
Figure 4C:
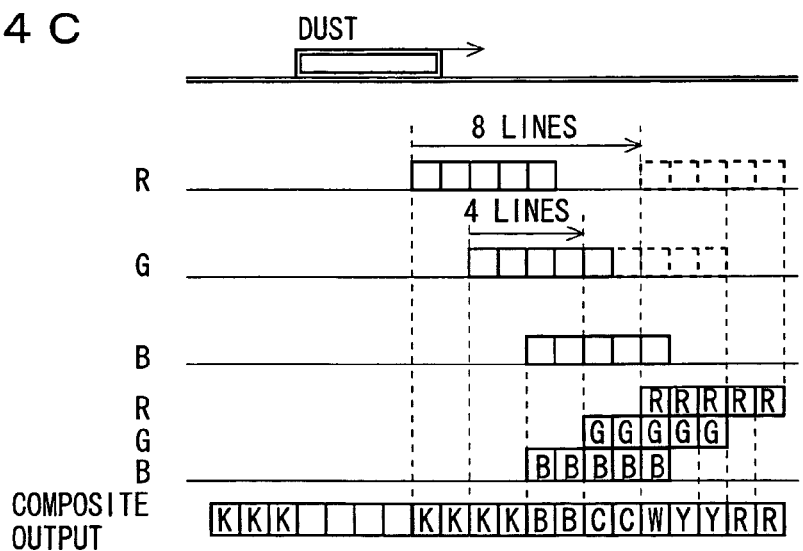

In the present embodiment image reading apparatus 10 detects noise generated by dust adhering on platen 205 from a read image in accordance with a theory as described hereinafter. FIGS. 4A-4C are diagrams for illustrating the theory. For the sake of illustration, an original and platen 205 are transported in the figures in a direction indicated by an arrow, and platen 205 moves at a rate which is the same in direction as and twice in magnitude that at which the original is transported. Furthermore for the sake of illustration the three line sensors are red light, green light and blue light receiving line sensors arranged red first, followed by green and then blue in the direction in which the original is transported, with a distance corresponding to three lines therebetween. R, G and B indicate outputs of the red light, green light and blue light receiving line sensors, respectively.

FIG. 4A is a diagram for illustrating interline correction. The image of a portion of the original is initially read by the red light receiving line sensor arranged most upstream in the direction in which the original is transported. The image is then transported by a distance corresponding to four lines, and read by the green light receiving line sensor. The image is further transported by a distance corresponding to four lines, and read by the blue light receiving sensor.

Thus an image located in an original at a single location is read by three line sensors at different times. As such, the three line sensors output signals offset in timing. Interline correction synchronizes the signals output from the three line sensors so that the signals all correspond to a single location in the original. More specifically, output R is delayed by eight lines and output G is delayed by four lines.

Interline corrected outputs R, G and B are composited to provide a composite output, which corresponds to outputs R, G and B read at a single location in an original and composited together.

FIG. 4B is a diagram for illustrating a composite output provided when dust adhering on a platen is read. The dust adhering on platen 205 is initially read by the red light receiving line sensor arranged most upstream in the direction in which an original is transported. The dust is transported by a distance corresponding to four lines, and read by the green light receiving line sensor. Since platen 205 moves in the same direction as the original at a rate twice that at which the original is transported, the dust moves by four lines in a period of time required for a line sensor to read the original by two lines. As such, between the time point at which the red line sensor reads the dust and that at which the green line sensor reads the dust there is introduced an offset by a period of time corresponding to reading two lines. Furthermore, the dust is transported by a distance corresponding to four lines, and read by the blue light receiving line sensor. Since platen 205 moves in the same direction as the original at a rate twice that at which the original is transported, between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B with the dust read are not composited at the same timing, offset by two lines.

Note that the figure shows a composite output provided when paper particles or similar white dust adhere on platen 205 and a black original is read. Despite that the white dust is read, the composite output is not white but rather an output of blue, green and red divided in three lines.

FIG. 4C is another diagram for illustrating a composite output provided when dust adhering on a platen is read. The figure shows an example of reading dust having a size corresponding to ten lines in the sub scanning direction. Platen 205 moves in the same direction as an original at a rate twice that at which the original is transported. As such, the dust is read as having a size corresponding to five lines.

The dust adhering on platen 205 is initially read by the red light receiving line sensor arranged most upstream in the direction in which the original is transported. The dust is then transported by a distance corresponding to four lines, and read by the green light receiving line sensor. Between the time point at which the red line sensor reads the dust and that at which the green line sensor reads the dust there is introduced an offset by a period of time corresponding to reading two lines. The dust further is transported by a distance corresponding to four lines, and read by the blue light receiving line sensor. Between the time point at which the green line sensor reads the dust and that at which the blue line sensor reads the dust there is introduced an offset by a period of time corresponding to reading two lines.

By interline correction the red light receiving line sensor reading the dust outputs R delayed by eight lines and the green light receiving line sensor reading the dust outputs G delayed by four lines. As such, interline corrected outputs R, G and B composited together provide a composite output in which outputs R, G and B by five lines with the dust read are not composited at the same timing, offset by two lines. Note that the figure shows a composite output provided when paper particles or similar white dust adhere on platen 205 and a black original is read. Despite that the white dust is read, the composite output is an output varying in color, first in blue, followed by cyan, white yellow and then red.

The dust adhering on platen 205 is thus divided in an image into a plurality of lines, which are extracted for each color as a feature point to detect noise. Furthermore, such division also reduces noise caused by reading the dust.

FIG. 5 is a plan, rear view of the platen. With reference to the figure, platen 205 has one end with a mark 205A having a single color and a geometry having in the main scanning direction a length varying depending on the position in the sub scanning direction. In this description, mark 205A is a black triangle. Furthermore, mark 205A has one side arranged parallel to one side of platen 205.

Reader 213 or a sensor provided separate from reader 213 and fixed to main body 103 can be used to detect the length of mark 205A in the main scanning direction to detect the position of platen 205 relative to reader 213.

Figure 6:
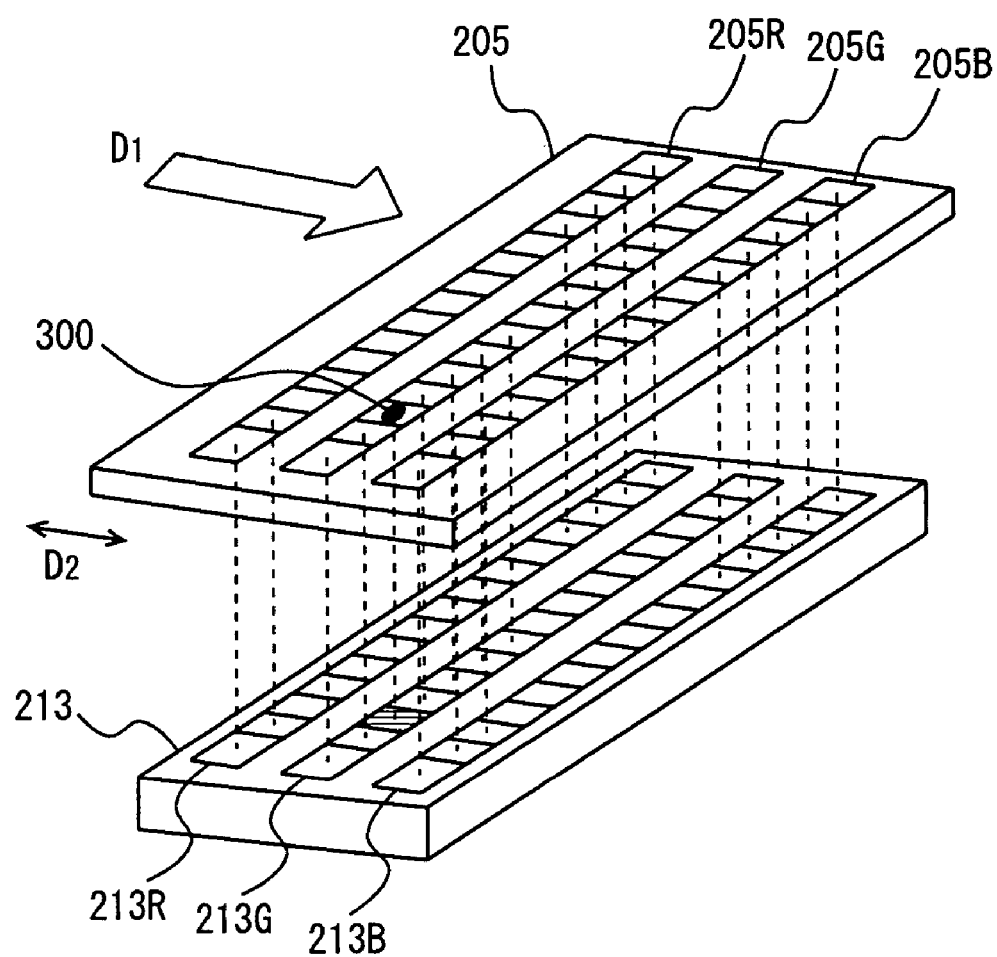
FIG. 6 shows a position on a platen read by a reader.

FIG. 6 shows a location on platen 205 read by reader 213. Reader 213 has line sensors 213R, 213G and 213B having filters of red (R), green (G) and blue (B), respectively, arranged in a direction in which an original is transported D1, red first, followed by green and then blue.

Line sensors 213R, 213G and 213B receive light transmitted through platen 205 at regions 205R, 205G and 205B, respectively. Regions 205R, 205G and 205B are arranged to be spaced by three lines. The original initially moves past region 205R, then region 205G and finally region 205B. As such, light reflected by the original at a location is initially received by the red light receiving line sensor 213R, then the green light receiving line sensor 213G, and finally the blue light receiving line sensor 213B. Line sensors 213R, 213G, 213B spaced by three lines thus will not simultaneously receive light reflected by the original at a single location.

If platen 205 has adhering thereto dust 300 having a maximal length of at most four lines, then dust 300 will not exist at two or more of regions 205R, 205G, 205B concurrently as platen 205 moves oscillating parallel to the sub scanning direction. FIG. 6 shows a case where dust 300 exists at region 205G. In this case, light reflected by dust 300 is received only by line sensor 213G and not received by line sensor 213R or 213B.

Furthermore, as platen 205 oscillates, dust 300 will exists at different regions. More specifically, when platen 205 moves in direction D1, dust 300 initially exists at region 205R, then region 205G and finally region 205B. In contrast, when platen 205 moves in a direction opposite direction D1, dust 300 exists initially at region 205B, then region 205G, and finally region 205R.

As such, light reflected by dust 300 is received in such an order that when platen 205 moves in direction D1 the light is received initially by line sensor 213R, then line sensor 213G and finally line sensor 213B and when platen 205 moves opposite to direction D1 the light is received initially by line sensor 213B, then line sensor 213G, and finally line sensor 213R.

When platen 205 moves in a direction in which an original is transported, noise caused by reading dust appears first in an R signal output by line sensor 213R, then in a G signal output by line sensor 213G, and finally in a B signal output by line sensor 213B. When platen 205 moves in a direction opposite the original, noise caused by reading dust appears first in a B signal output from line sensor 213B, then in a G signal output from line sensor 213G, and finally in an R signal output from line sensor 213R. In other words, noise generated by reading dust appears in signals in an order determined by the direction in which platen 205 moves. By determining an order in which noise is detected from R, G and B signals, noise can be detected with higher precision.

Figure 7:
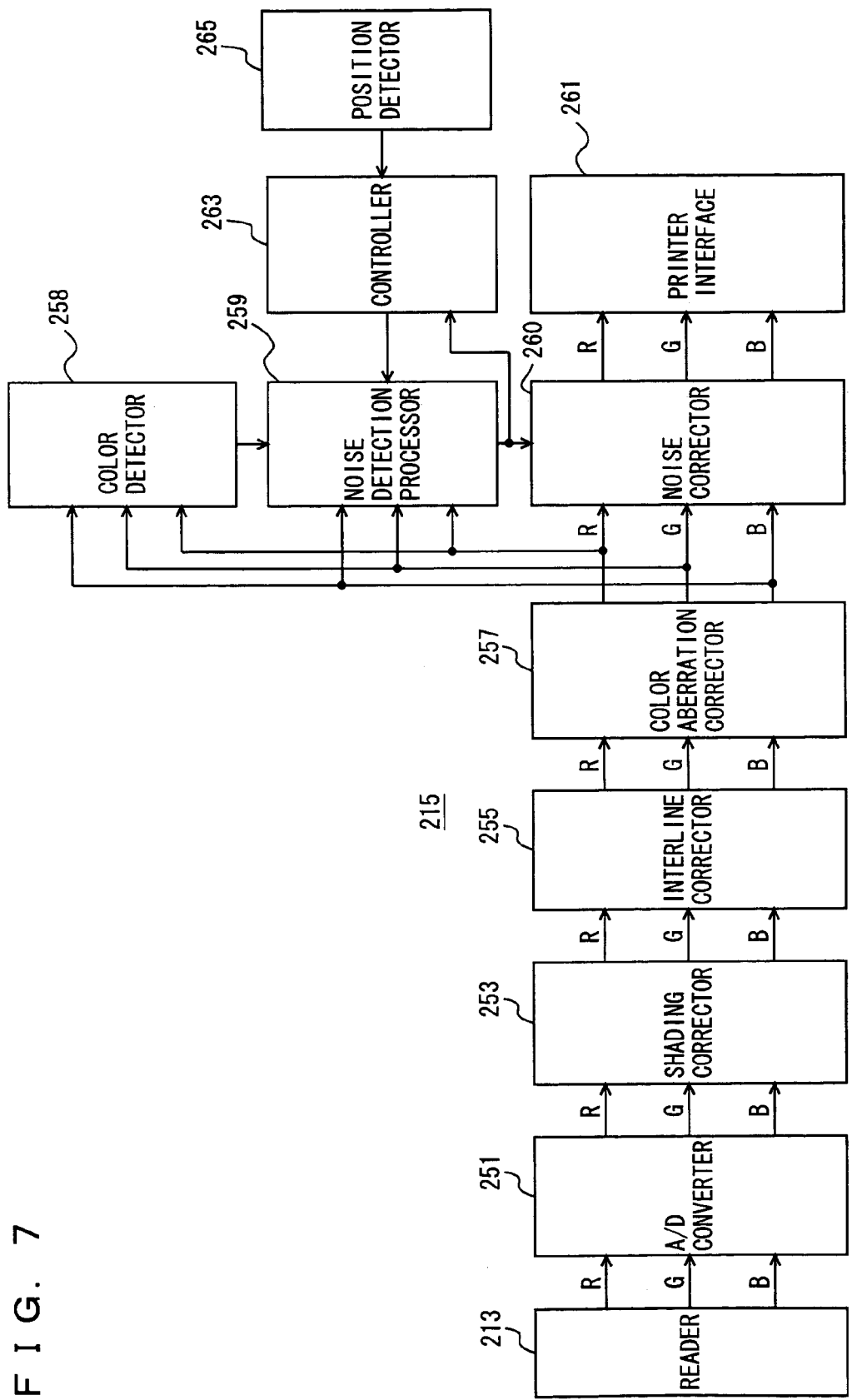
FIG. 7 is a block diagram showing a configuration of an image processor of the image reading apparatus in the present embodiment.

FIG. 7 is a block diagram showing a configuration of the image processor of the image reading apparatus in the present embodiment. With reference to the figure, image processor 215 receives R, G and B signals from reader 213. Image processor 215 includes an analog/digital (A/D) converter 251 receiving an analog signal from reader 213 to convert the analog signal to a digital signal, a shading corrector 253 correcting uneven illumination provided by the source of light 206 or the like, an interline corrector 255 synchronizing the R, G and B signals to be a single line of an original, a color aberration corrector 257 correcting distortion in the main scanning direction introduced by lens 211, a color detector 258 detecting each pixel's color from R, G and B signals, a noise detection processor 259 detecting noise from each of the R, G and B signals, a noise corrector 260 effecting a process to correct a noise pixel, a controller 263 generally controlling image processor 215, and a printer interface 261 used to output an image to image forming apparatus 20. Controller 263 has a position detector 265 connected thereto to detect the position of platen 205. Position detector 265 detects a length of mark 205A of platen 205 in the main scanning direction.

Interline corrector 255 delays the R and G signals by eight and four lines, respectively, to synchronize the R, G and B signals to be a single line of the original, since as has been described previously, line sensors 213R, 213G, 213B are spaced in the sub scanning direction by a distance corresponding to three lines.

Color detector 258 receives R, G, and B signals and detects a color for each pixel from all of the signals.

Color detector 258 detects each pixel's color. The color is achromatic (black (K) or white (W)), red (R), magenta (M), blue (B), cyan (C), green (G), or yellow (Y). Herein, R, G and B signals are input by one line. Accordingly, a color of each and every pixel in the one line is detected. The detected color is output to noise detection processor 259 as a color signal corresponding a collection for the one line.

Noise detection processor 259 receives the R, G and B signals from color aberration corrector 257, and a color signal from color detector 258. Noise detection processor 259 detects a noise pixel in accordance with the color signal for each of the R, G and B signals received from color aberration corrector 257, and outputs to noise corrector 260 and controller 263 logical signals of "1" and "0" indicating a noise pixel and a pixel other than a noise pixel, respectively. The detail will be described later.

Noise corrector 260 receives the R, G and B signals from color aberration corrector 257 and from noise detection processor 259 receives for each of the R, G and B signals logical signal of "1" and "0" indicating a noise pixel and a pixel other than a noise pixel, respectively.

Noise corrector 260 determines from logical signals corresponding to the R, G and B signals, respectively, a color of a pixel determined as a noise pixel. More specifically, noise corrector 260 determines a color of a noise pixel successive in the sub scanning direction. Furthermore, if noise pixels are not successive in the sub scanning direction then a color of a pixel existing between two noise pixels is determined, and if the pixels are identically located in the main scanning direction and vary in color in the sub scanning direction in the following order:
(1) CBMRY or YRMBC
(2) CBKRY or YRKBC
(3) RYGCB or BCGYR
(4) RYWCB or BCWYR then the pixels are all determined as noise pixel, wherein R, G, B, C, M, Y, K, and W represent red, green, blue, cyan, magenta, yellow, black, and white, respectively. It should be noted, however, that herein an order in which a color varies is only indicated, and two or more pixels of the same color may be successively provided. For example, it may be CCBBM-MRRYY.

Thus if dust has a size read by a plurality of line sensors concurrently, herein a size corresponding to four or more lines, noise caused by reading the dust can be detected.

Furthermore, noise corrector 260 operates for each of the R, G and B signals in response to a logical signal corresponding thereto to replace a value of a pixel determined as a noise pixel with that of a neighboring, non-noise pixel. This can simply be done by replacing the value of the pixel determined as the noise pixel with an average, maximum or minimum value of a plurality of neighboring non-noise pixels. Noise corrector 260 outputs to the printer interface the R, G and B signals with any noise pixels replaced with a neighboring pixel(s).

Controller 263 receives the position of platen 205 from position detector 265 and from noise detection processor 259 logical signals of "1" and "0" indicating a noise pixel and a pixel other than noise pixel, respectively. Controller 263 determines from these signals the dust's location on platen 205. More specifically, it determines the position of platen 205 in the sub scanning direction from the position of platen 205 and a logical signal's line number, and the position of platen 205 in the main scanning direction from a location of a noise pixel of the logical signal.

Figure 8:
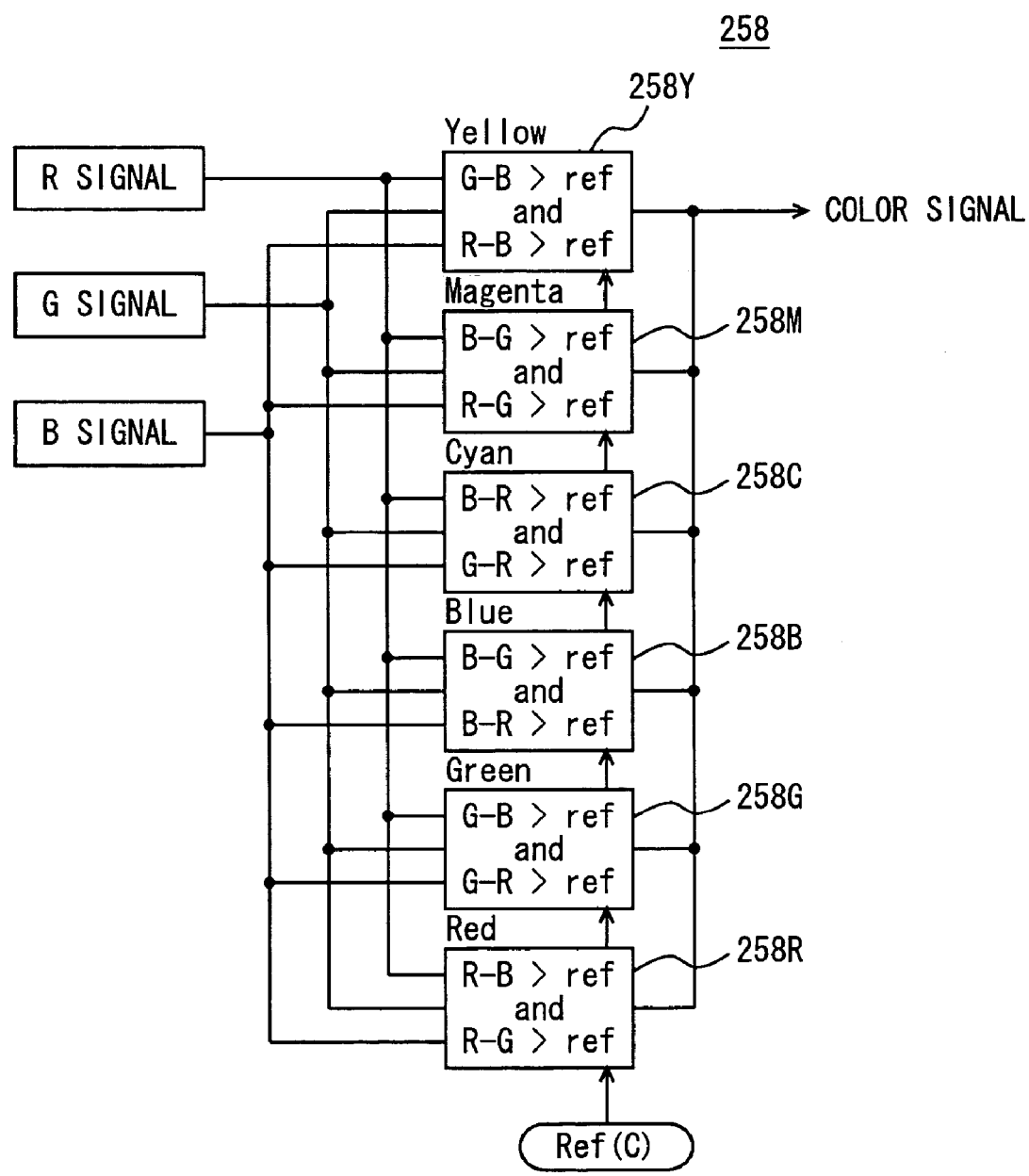
FIG. 8 shows one example of a configuration of a surrounding-color detector.
Figure 9A:
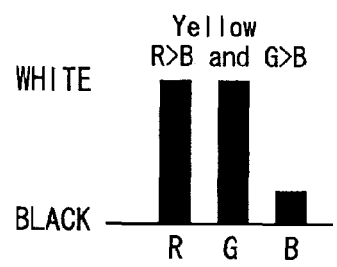
FIGS. 9A-9F show one example of a color detected by the surrounding-color detector.
Figure 9B:
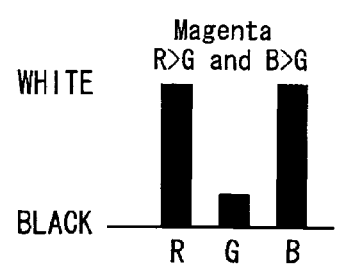
Figure 9C:
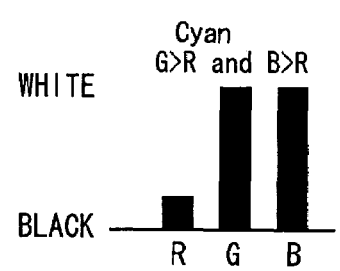
Figure 9D:
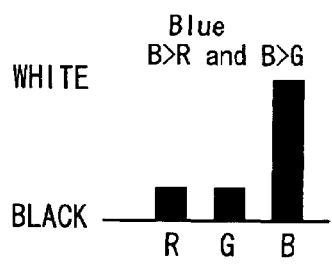
Figure 9E:
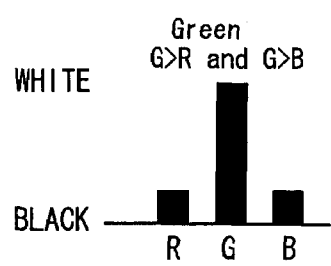
Figure 9F:
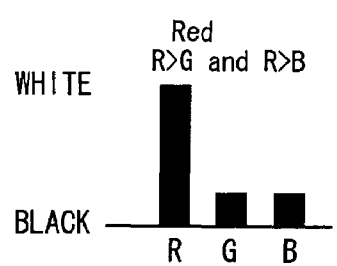

FIG. 8 shows one example of a configuration of color detector 258. With reference to figure, color detector 258 includes color determiners 258Y, 258M, 258C, 258B, 258G and 258R that determine the colors of yellow (Y), magenta (M), cyan (C), blue (B), green (G) and red (R), respectively. Color determiners 258Y, 258M, 258C, 258B, 258G and 258R each receive R, G and B signals and a threshold value Ref(C) having a predetermined value and stored for example in a ROM. Note that threshold value Ref(C) may be a different value for each of color determiners 258Y, 258M, 258C, 258B, 258G and 258R.

Color determiner 258Y determines the color of yellow. Accordingly when G and B signals have a difference greater than threshold value Ref(C) and R and B signals have a difference greater than threshold value Ref(C) color determiner 358Y outputs as a color signal a signal indicating the color of yellow.

Color determiner 258M determines the color of magenta. Accordingly when B and G signals have a difference greater than threshold value Ref(C) and R and G signals have a difference greater than threshold value Ref(C) color determiner 258M outputs as a color signal a signal indicating the color of magenta.

Color determiner 258C determines the color of cyan. Accordingly when B and R signals have a difference greater than threshold value Ref(C) and G and R signals have a difference greater than threshold value Ref(C) color determiner 258C outputs as a color signal a signal indicating the color of cyan.

Color determiner 258B determines the color of blue. Accordingly when B and G signals have a difference greater than threshold value Ref(C) and B and R signals have a difference greater than threshold value Ref(C) color determiner 258B outputs as a color signal a signal indicating the color of blue.

Color determiner 258G determines the color of green. Accordingly when G and B signals have a difference greater than threshold value Ref(C) and G and R signals have a difference greater than threshold value Ref(C) color determiner 258G outputs as a color signal a signal indicating the color of green.

Color determiner 258R determines the color of red. Accordingly when R and B signals have a difference greater than threshold value Ref(C) and R and G signals have a difference greater than threshold value Ref(C) color determiner 258R outputs as a color signal a signal indicating the color of red.

Color detector 258 outputs a color signal output from color determiners 258Y, 258M, 258C, 258B, 258G or 258R. If none of color determiners 258Y, 258M, 258C, 258B, 258G, 258R outputs a color signal, surrounding-color detector 258 outputs a signal of an achromatic color.

FIGS. 9A-9F show one example of a color determined by color detector 258. FIGS. 9A, 9B, 9C, 9D, 9E, and 9F show one example of lightness satisfying conditions for detecting yellow, magenta, cyan, blue, green, and red, respectively.

The noise detection process will more specifically be described hereinafter. As has been described with reference to FIG. 6, line sensors 213R, 213G and 213B will read different locations on an original at the same timing. Interline corrector 255 synchronizes the R, G and B signals' lines to obtain R, G and B signals having read a single location on the original.

As such, if platen 205 has dust adhering thereon, R, G and B signals having read a single location on an original have one of them affected.

FIGS. 10A and 10B represent an example of RGB signal output from the reader. FIG. 10A shows an example of reading a white area of an original with black dust adhering on the platen's region 205R corresponding to line sensor 213R. Line sensor 213R reads a portion of the original with the black dust on region 205R. Subsequently, the portion of the original moves to regions 205G, 205B corresponding to line sensors 213G, 213B, when the dust does not exist on regions 205G, 205B, since the original and platen 205 moves at different rates. As such line sensors 213G, 213B will read the original's white area. Consequently, only an R signal output from line sensor 213R is reduced in lightness and line sensors 213G, 213B output G and B signals high in lightness. Note that herein, "lightness" indicates a value output from the three line sensors 213R, 213G, 213B corresponding to a reflection of light.

The FIG. 10A RGB signals' combination is seldom output when an original is read without dust adhering thereto. A combination closest thereto is a case where an area of cyan, a color complementary to red, is read. FIG. 10B represents RGB signal output from reader 213 when an original's cyan area is read. The R signal significantly drops in lightness, and the G and B signals also drops in lightness. As such, the variation in lightness of the R signal significantly dropping in lightness can be detected by using a threshold value Red1(R).

The FIG. 10A RGB signal and the FIG. 10B RGB signal are significantly different in whether the B and G signals are affected. By detecting this difference, black dust can be detected as noise without detecting a cyan line erroneously as noise. As such, the B signal's variation in lightness is detected by using a threshold value Ref2(B). Threshold value Ref2(B) can simply be provided by the smallest one of the following values. Hereinafter, threshold values Ref2(R), Ref2(G), Ref2 (B) are indicated.

(1) Detecting Dust of Achromatic Color High in Lightness

To prevent a cyan line from being detected erroneously as noise, the difference between a maximum value in lightness (255) and one of the values in lightness output from the line sensors other than line sensor 213R, i.e., line sensors 213G and 213B, reading a color complementary to red, or cyan, can be set as Ref2(G), Ref2(B). To prevent a magenta line from being detected erroneously as noise, the difference between the maximum value in lightness (255) and one of the values in lightness output from the line sensors other than line sensor 213G, i.e., line sensors 213R and 213B, reading a color complementary to green, or magenta, can be set as Ref2(R), Ref2(B). To prevent a yellow line from being detected erroneously as noise, the difference between the maximum value in lightness (255) and one of the values in lightness output from the line sensors other than line sensor 213B, i.e., line sensors 213R and 213G, reading a color complementary to blue, or yellow, can be set as Ref2(R), Ref2(G).

(2) Detecting Dust of Achromatic Color Low in Lightness

To prevent a red line from being detected erroneously as noise, the difference between a minimum value in lightness (0) and one of the values in lightness output from the line sensors other than line sensor 213R, i.e., line sensors 213G and 213B, reading red color, can be set as Ref2(G), Ref2(B). To prevent a green line from being detected erroneously as noise, the difference between the minimum value in lightness (0) and one of the values in lightness output from the line sensors other than line sensor 213G, i.e., line sensors 213R and 213B, reading green color, can be set as Ref2(R), Ref2 (B). To prevent a blue line from being detected erroneously as noise, the difference between the minimum value in lightness (0) and one of the values in lightness output from the line sensors other than line sensor 213B, i.e., line sensors 213R and 213G, reading blue color, can be set as Ref2(R), Ref2(G).

Thus more than one threshold value Ref2(R), Ref2(G), Ref2(B) are obtained, and a minimum value thereof can simply be used.

While herein black dust is detected as noise, dust of achromatic color other than black can also be detected, since any achromatic dust affects all of R, G and B signals.

Furthermore, while herein a white original is read by way of example, an original of any color other than white may be read.

However, if an original's red, yellow or magenta region is read with dust of achromatic color, e.g., white existing in region 205R corresponding to line sensor 213R, line sensor 213R outputs an R signal having only a limited variation in lightness. If an original's green, yellow or cyan region is read with dust of achromatic color, e.g., white existing in region 205G corresponding to line sensor 213G, line sensor 213G outputs a G signal having only a limited variation in lightness. If an original's blue, magenta or cyan region is read with dust of achromatic color, e.g., white existing in region 205B corresponding to line sensor 213B, line sensor 213B outputs a B signal having only a limited variation in lightness. Thus there are combinations of colors of originals and line sensors 213R, 213G, 213B that allow a noise pixel to be detected from signals output from the line sensors.

In the present embodiment image reading apparatus 10 employs the above described combination and determines from a color of a pixel to be processed and a color of a pixel neighboring the pixel to be processed (or the original's color) a signal output from line sensor 213R, 213G, 213B for detecting a noise pixel. The pixel to be processed is a pixel subject to a process performed to determine whether to validate or invalidate a result detected as a noise pixel- and a noise pixel detected from a determined output signal is validated. Noise pixel can be detected with higher precision.

Figure 11:
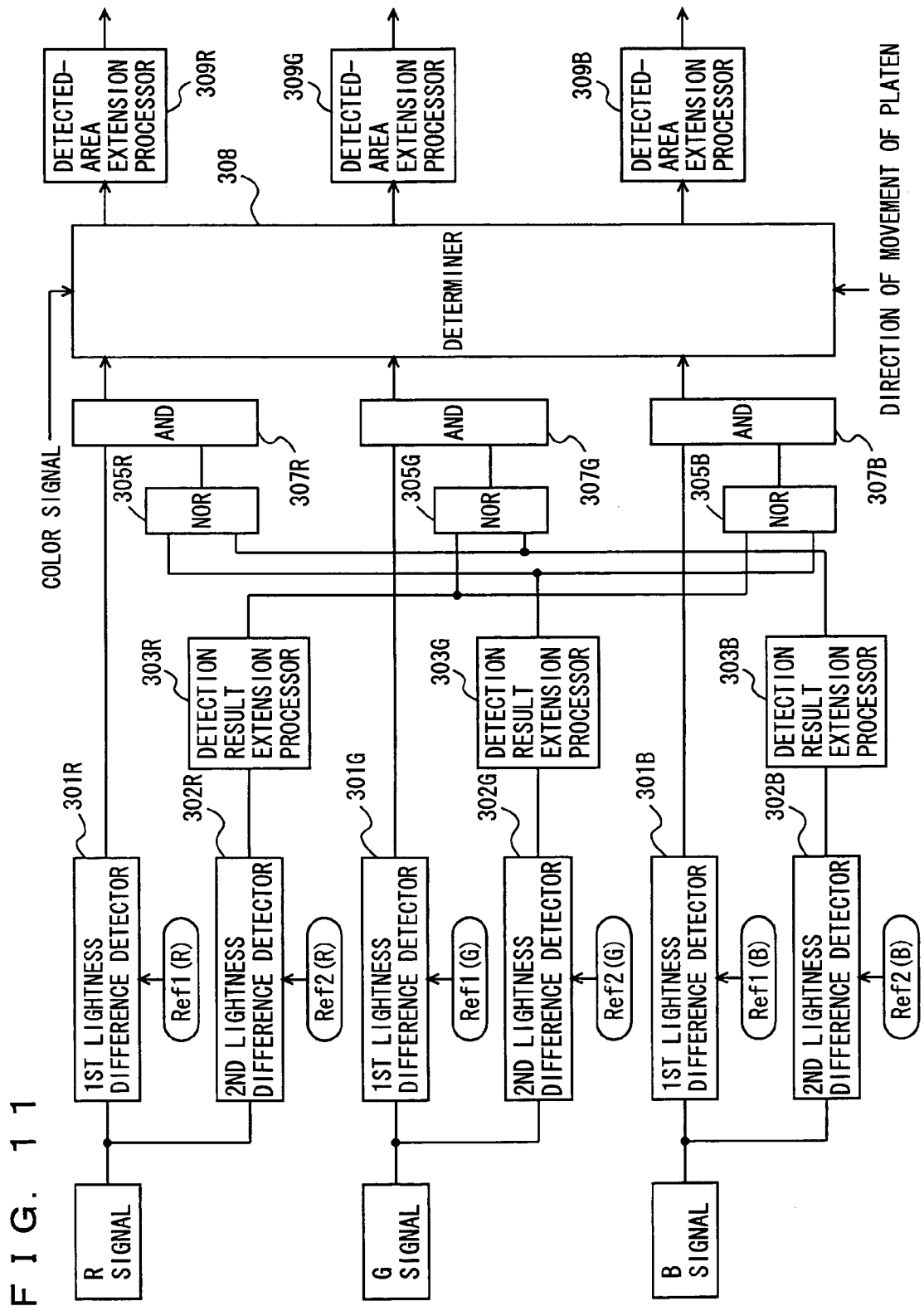
FIG. 11 is a block diagram showing a configuration of a noise detection processor of the image reading apparatus of the present embodiment.

FIG. 11 is a block diagram showing a configuration of the noise detection processor of the image reading apparatus in the present embodiment. With reference to the figure, noise detection processor 259 includes first lightness difference detectors 301R, 301G, 301B extracting from R, G and B signals, respectively, a region having a predetermined feature, second lightness difference detectors 302R, 302G, 302B extracting from R, G and B signals, respectively, a region having the predetermined feature, detection result extension processors 303R, 303G, 303B extending the region extracted by the second lightness detectors 302R, 302G, 302B to a vicinity thereof, NOR devices 305R, 305G, 305B, AND devices 307R, 307G, 307B, and detected-area extension processors 309R, 309G, 309B.

R, G, B signals are input to noise detection processor 259, one line at a time, sequentially. Note that the R, G and B signals may be input collectively by a plurality of lines or an entire image.

The first lightness difference detector 301R receives the R signal and threshold value Ref1(R) and extracts from the R signal a region having the predetermined feature of a first level. This region is a region having a limited variation in lightness and a difference in lightness of at least threshold Ref1(R) from a region surrounding it. Such region is only required to have a size of at least, one pixel. In this description a pixel included in a region having the predetermined feature of the first level will be referred to as a first feature pixel.

The region having the predetermined feature of the first level may be extracted by employing an edge extraction filter. More than one edge extraction filter are prepared for sizes of edge regions, respectively, and a value obtained as a result of filtering is compared with threshold value Ref2(R). A pixel satisfying a condition with threshold value Ref1(R) is determined as a center pixel of an edge region and from an edge extraction filter satisfying that condition the edge region's size is obtained.

Figure 12A:
FIGS. 12A-12F show one example of an edge extraction filter.
Figure 12B:
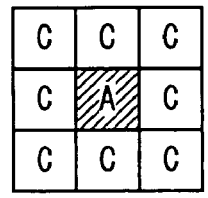

FIGS. 12A-12F represent the edge extraction filter by way of example. FIG. 12A represents an edge extraction filter used to detect an edge region of a size of one pixel when an R signal is input, one line at a time. FIG. 12B represents an edge extraction filter used to detect an edge region of a size of one pixel when an R signal is input in a plurality of lines correctively.

Figure 12C:
Figure 12D:
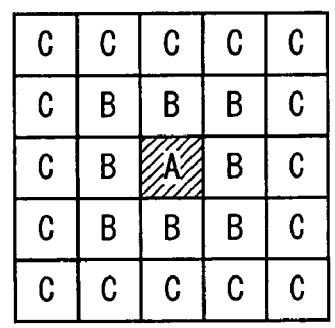

FIG. 12C represents an edge extraction filter used to detect an edge region of a size of three pixels when an R signal is input, one line at a time. FIG. 12D represents an edge extraction filter used to detect an edge region of a size of three pixels when an R signal is input in a plurality of lines correctively.

Figure 12E:
Figure 12F:
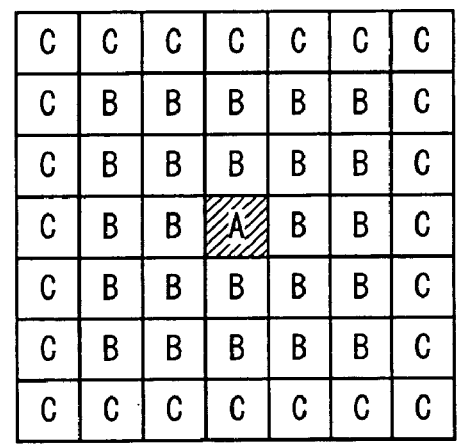

FIG. 12E represents an edge extraction filter used to detect an edge region of a size of five pixels when an R signal is input, one line at a time. FIG. 12F represents an edge extraction filter used to detect an edge region of a size of five pixels when an R signal is input in a plurality of lines correctively.

These edge extraction filters are established under the following conditions:

(1) An edge region high in lightness is extracted when an average in lightness of pixels A and B minus that in lightness of pixel C equals at least threshold value Ref1(R):

$$(\text{Average of Pixels } A \text{ and } B) - (\text{Average of Pixel } C) > \text{Ref1}(R).$$

In that case, the center pixel is one of pixels A, B and C that is the highest in lightness.

(2) An edge region low in lightness is extracted when an average in lightness of pixel C minus that in lightness of pixels A and B equals at least threshold value Ref1(R):

$$(\text{Average of Pixel } C) - (\text{Average of Pixels } A \text{ and } B) > \text{Ref1}(R).$$

In that case, the center pixel is one of pixels A, B and C that is the lowest in lightness.

G and B signals can also be handled with an edge extraction filter similar to that used for the R signal.

The first lightness difference detectors 301R, 301G, 301B compare a value calculated by the above described edge extraction filter with threshold values Ref1(R), Ref1(G), Ref1(B).

With reference again to FIG. 11, the first feature pixel extracted by the first lightness difference detector 301R is represented by a logical signal of "1" and a pixel other than the first feature pixel is represented by a logical signal of "0" and thus output to AND device 307R.

The second lightness difference detector 302R receives the R signal and threshold value Ref2(R) and extracts from the R signal a region having the predetermined feature of a second level. This region is a region having a limited variation in lightness and a difference in lightness of at least threshold Ref2(R) from a region surrounding it. Such region is only required to have a size of at least one pixel. In this description a pixel included in a region having the predetermined feature of the second level will be referred to as a second feature pixel. It should be noted that threshold value Ref2(R) is a smaller value than threshold value Ref1(R).

The region having the predetermined feature of the second level may be extracted by employing an edge extraction filter. More than one edge extraction filter are prepared for sizes of edge regions, respectively, and a value obtained as a result of filtering is compared with threshold value Ref2(R). A pixel satisfying a condition with threshold value Ref2(R) is determined as a center pixel of an edge region and from an edge extraction filter satisfying that condition the edge region's size is obtained.

The second lightness difference detectors 302R, 302G, 302B compare a value calculated by the above described edge extraction filter with threshold values Ref2(R), Ref2(G), Ref2(B).

The second feature pixel extracted by the second lightness difference detector 302R is represented by a logical signal of "1" and a pixel other than the second feature pixel is represented by a logical signal of "0" and thus output to detection result extension processor 303R.

Detection result extension processor 303R sets a pixel neighboring the second feature pixel extracted by the second lightness difference detector 302R as a second feature pixel to extend a region having the predetermined feature of the second level. In other words, a pixel that exists in a vicinity of a pixel of "1" in value as represented by a logical signal received from the second lightness difference detector 302R and has a value of "0" is changed to "1". Noise can be detected with higher precision. A logical signal having contributed to extended region is output to NOR devices 305G, 305B.

The first lightness difference detector 301G receives the G signal and threshold value Ref1(G) and extracts from the G signal a region having the predetermined feature of the first level. This region is a region having a limited variation in lightness and a difference in lightness of at least threshold Ref1(G) from a region surrounding it.

The region having the predetermined feature of the first level may be extracted by employing an edge extraction filter. More than one edge extraction filter are prepared for sizes of edge regions, respectively, and a value obtained as a result of filtering is compared with threshold value Ref1(G). A pixel satisfying a condition with threshold value Ref1(G) is determined as a center pixel of an edge region and from an edge extraction filter satisfying that condition the edge region's size is obtained.

The feature pixel extracted by the first lightness difference detector 301G is represented by a logical signal of "1" and a pixel other than the first feature pixel is represented by a logical signal of "0" and thus output to AND device 307G.

The second lightness difference detector 302G receives the G signal and threshold value Ref2(G) and extracts from the G signal a region having the predetermined feature of the second level. This region is a region having a limited variation in lightness and a difference in lightness of at least threshold Ref2(G) from a region surrounding it. Such region is only required to have a size of at least one pixel. In this description a pixel included in a region having the predetermined feature of the second level will be referred to as a second feature pixel. It should be noted that threshold value Ref2(G) is a smaller value than threshold value Ref1(G).

The region having the predetermined feature of the second level may be extracted by employing an edge extraction filter. More than one edge extraction filter are prepared for sizes of edge regions, respectively, and a value obtained as a result of filtering is compared with threshold value Ref2(G). A pixel satisfying a condition with threshold value Ref2(G) is determined as a center pixel of an edge region and from an edge extraction filter satisfying that condition the edge region's size is obtained.

The second feature pixel extracted by the second lightness difference detector 302G is represented by a logical signal of "1" and a pixel other than the second feature pixel is represented by a logical signal of "0" and thus output to detection result extension processor 303R.

Detection result extension processor 303G sets a pixel neighboring the second feature pixel extracted by the second lightness difference detector 302G as a second feature pixel to extend a region having the predetermined feature of the second level. A logical signal having contributed to an extended region is output to NOR devices 305R, 305B.

The first lightness difference detector 301B receives the B signal and threshold value Ref1(B) and extracts from the B signal a region having the predetermined feature of the first level. This region is a region having a limited variation in lightness and a difference in lightness of at least threshold Ref1(B) from a region surrounding it.

The region having the predetermined feature of the first level may be extracted by employing an edge extraction filter. More than one edge extraction filter are prepared for sizes of edge regions, respectively, and a value obtained as a result of filtering is compared with threshold value Ref1(B). A pixel satisfying a condition with threshold value Ref1(B) is determined as a center pixel of an edge region and from an edge extraction filter satisfying that condition the edge region's size is obtained.

The feature pixel extracted by the first lightness difference detector 301B is represented by a logical signal of "1" and a pixel other than the first feature pixel is represented by a logical signal of "0" and thus output to AND device 307B.

The second lightness difference detector 302B receives the B signal and threshold value Ref2(B) and extracts from the B signal a region having the predetermined feature of the second level. This region is a region having a limited variation in lightness and a difference in lightness of at least threshold Ref2(B) from a region surrounding it. Such region is only required to have a size of at least one pixel. In this description a pixel included in a region having the predetermined feature of the second level will be referred to as a second feature pixel. It should be noted that threshold value Ref2(B) is a smaller value than threshold value Ref1(B).

The region having the predetermined feature of the second level may be extracted by employing an edge extraction filter. More than one edge extraction filter are prepared for sizes of edge regions, respectively, and a value obtained as a result of filtering is compared with threshold value Ref2(B). A pixel satisfying a condition with threshold value Ref2(B) is determined as a center pixel of an edge region and from an edge extraction filter satisfying that condition the edge region's size is obtained.

The second feature pixel extracted by the second lightness difference detector 302B is represented by a logical signal of "1" and a pixel other than the second feature pixel is represented by a logical signal of "0" and thus output to detection result extension processor 303B.

Detection result extension processor 303B sets a pixel neighboring the second feature pixel extracted by the second lightness difference detector 302B as a second feature pixel to extend a region having the predetermined feature of the second level. A logical signal having contributed to an extended region is output to NOR devices 305R, 305G.

NOR device 305R receives from each of detection result extension processor 303G, 303B a logical signal having contributed to an extended region. NOR device 305R outputs to AND device 307R a logical signal corresponding to an inversion of an OR of two received logical signals. More specifically, a pixel which is not a second feature pixel for either a G or B signal is represented by a logical signal of "1" for output and a pixel which is a second feature pixel for at least one of the signals is represented by a logical signal of "0" for output.

AND device 307R outputs to determiner 308 an AND of a logical signal received from the first lightness difference detector 301R and that received from NOR device 305R. More specifically, a pixel which is a first feature pixel for an R signal and not an extended second feature pixel for either a B or G signal is represented by a logical signal of "1" and a pixel different therefrom is represented by a logical signal of "0" for output. A pixel of "1" in value as represented by this logical signal indicates a noise pixel. Thus by NOR device 305R and AND device 307R a first feature pixel extracted from an R signal that has not been extracted as a second feature pixel for either a G or B signal is determined as a noise pixel.

NOR device 305G receives from each of detection result extension processors 303R, 303B a logical signal having contributed to an extended region. NOR device 305G outputs to AND device 307G a logical signal corresponding to an inversion of an OR of two received logical signals. More specifically, a pixel which is not a second feature pixel for either an R or B signal is represented by a logical signal of "1" for output and a pixel which is a second feature pixel for at least one of the signals is represented by a logical signal of "0" for output.

AND device 307G outputs to determiner 308 an AND of a logical signal received from the first lightness difference detector 301G and that received from NOR device 305G. More specifically, a pixel which is a first feature pixel for a G signal and not an extended second feature pixel for either a R or B signal is represented by a logical signal of "1" and a pixel different therefrom is represented by a logical signal of "0" for output. A pixel of "1" in value as represented by this logical signal indicates a noise pixel. Thus by NOR device 305G and AND device 307G a first feature pixel extracted from a G signal that has not been extracted as a second feature pixel for either an R or B signal is determined as a noise pixel.

NOR device 305B receives from each of detection result extension processors 303R, 303G a logical signal having contributed to an extended region. NOR device 305B outputs to AND device 307B a logical signal corresponding to an inversion of an OR of two received logical signals. More specifically, a pixel which is not a second feature pixel for either an R or G signal is represented by a logical signal of "1" for output and a pixel which is a second feature pixel for at least one of the signals is represented by a logical signal of "0" for output.

AND device 307B outputs to determiner 308 an AND of a logical signal received from the first lightness difference detector 301B and that received from NOR device 305B. More specifically, a pixel which is a first feature pixel for a B signal and not an extended second feature pixel for either an R or G signal is represented by a logical signal of "1" and a pixel different therefrom is represented by a logical signal of "0" for output. A pixel of "1" in value as represented by this logical signal indicates a noise pixel. Thus by NOR device 305B and AND device 307B a first feature pixel extracted from a B signal that has not been extracted as a second feature pixel for either an R or G signal is determined as a noise pixel.

Determiner 308 receives from AND devices 307R, 307G, 307B a logical signal of "1" indicating a noise pixel of each of R, G and B signals, respectively, one line at a time, sequentially. Furthermore, determiner 308 receives a color signal from surrounding-color detector 258. Determiner 308 makes a decision from a combination of the noise pixel's color and that of a pixel existing in a vicinity thereof as to whether the noise pixel is valid, and determiner 208 outputs to detected-area extension processors 309R, 309G, 309B a logical signal of "1" indicating only a noise pixel for which a decision is made that it is valid.

If detected-area extension processor 309R receives a logical signal of "1" from AND device 307R for a pixel, detected-area extension processor 309R sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

If detected-area extension processor 309G receives a logical signal of "1" from AND device 307G for a pixel, detected-area extension processor 309G sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

If detected-area extension processor 309B receives a logical signal of "1" from AND device 307B for a pixel, detected-area extension processor 309B sets a pixel that exists in a vicinity of the pixel corresponding to the "1" to a "1" to extend a noise pixel's range. This is done to provide improved precision with which a noise pixel is corrected. The noise pixel extended in range is represented by a logical signal of "1" which is in turn output to noise corrector 260.

Determiner 308 effects a decision process, as will be described more specifically hereinafter. Line sensors 213R, 213G and 213B each react to light of a limited range in wavelength. As such, if the platen has black dust adhering thereon and the location on an original that is to be read has a color reflecting light other than a range in waveform as limited for each line sensor 213G, 213G and 213B, a noise pixel is not detected. If the platen has white dust adhering thereon and the location on an original that is to be read has a color reflecting light falling within a range in waveform as limited for each line sensor 213R, 213G and 213B, a noise pixel is not detected. As such, for some colors represented on an original, there is a signal of R, G, and B signals from which a noise pixel is not detected. Furthermore a color presented by an original determines a color of a noise pixel detectable for each of R, G and B signals.

Determiner 308 has previously stored for example in its equipped ROM a decision table defining a set of a color of a noise pixel detectable for each of R, G and B signals, and a color (a background color) presented on an original. Determiner 308 uses the table with a color surrounding a noise pixel as a background color to determine whether a set of the noise pixel's color and that surrounding the noise pixel is a set detectable as a noise pixel. If so, then determiner 308 validates the noise pixel. Otherwise, determiner 308 invalidates the noise pixel.

FIG. 13 shows one example of the decision table. It defines for each RGB signal a combination of a background color and a color of a noise pixel detectable for the background color. In the figure, colors of noise pixels detectable by a matrix with vertical elements corresponding to background colors and horizontal elements corresponding to RGB signal are indicated for white dust and black dust separately. Furthermore, in the figure, white, black, red, magenta, blue, cyan, green, and yellow are indicated by W, K, Y, M, C, R, G, and B, respectively. In the figure the symbol "-" indicates that there is not a combination of a background color and a color of a noise pixel, i.e., that for the background color a noise pixel cannot be detected.

For example the table defines for a background color of red (R) that for white dust there does not exist for an R signal a combination of the background color of red (R) and a color of a noise pixel, for a G signal a combination of the background color of red (R) and a color of yellow (Y) of a noise pixel is defined, and for a B signal a combination of the background color of red (R) and a color of magenta (M) of a noise pixel is defined. Furthermore, for black dust, for an R signal a combination of the background color of red (R) and a color of black (K) of a noise pixel is defined, and for G and B signals the table defines that there does not exist a combination of the background color of red (R) and a color of a noise pixel.

Figure 14:
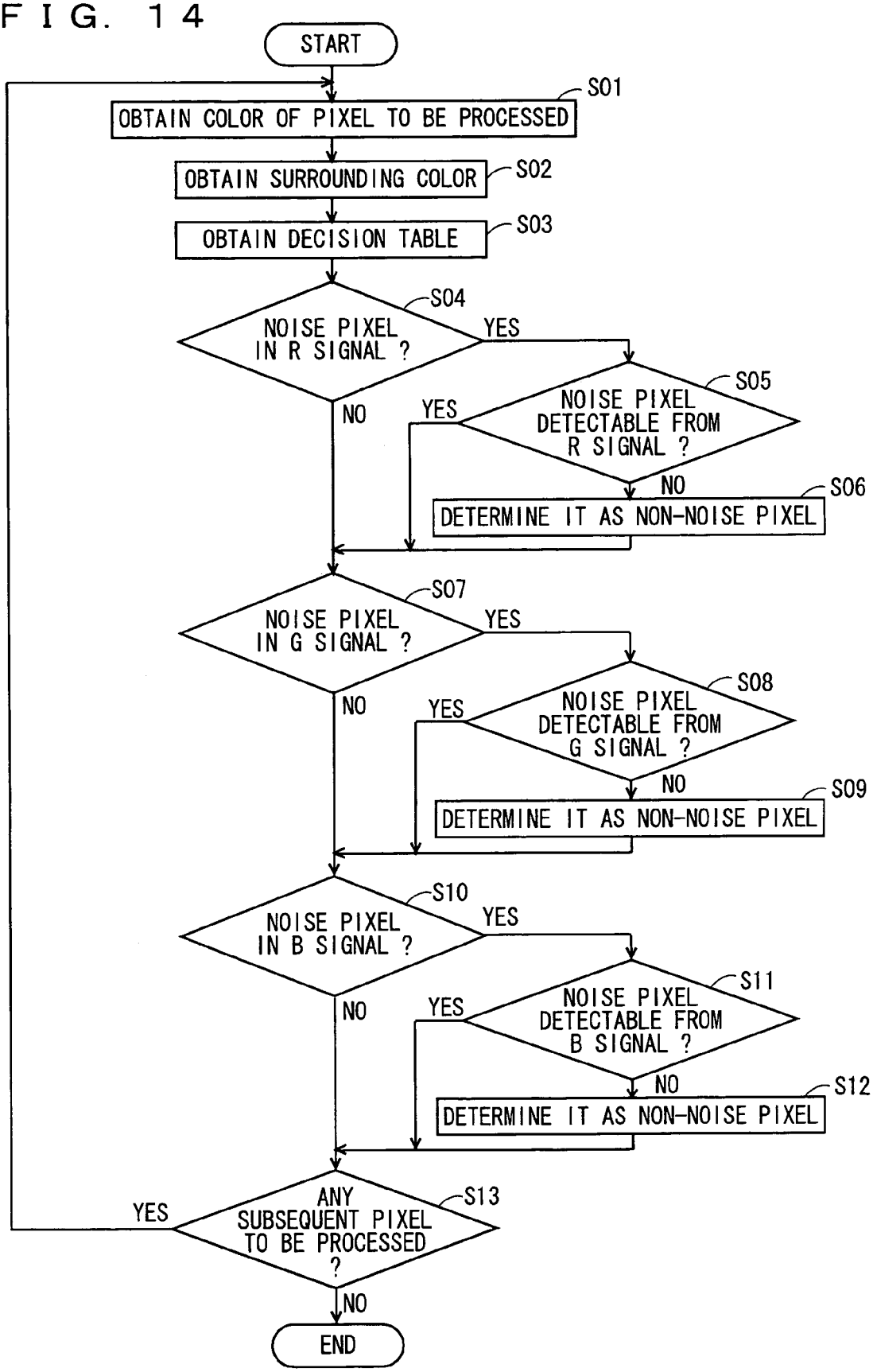
FIG. 14 is a flow chart of a process effected by the noise detection processor's determiner.

FIG. 14 is a flow chart of a decision process effected in the noise detection processor by the determiner. With reference to the figure, a color of a pixel to be processed is obtained (step (S)01) and a color surrounding the pixel to be processed is obtained (S02). The color of the pixel to be processed is obtained from a color signal received from color detector 258. Furthermore the surrounding color is a color of a pixel neighboring the pixel to be processed, and it is obtained from a color signal received from color detector 258. More specifically, the neighboring pixel is two pixels adjacent in the main scanning direction to the pixel to be processed. If two neighboring pixels are different, two pixels adjacent in the subscanning direction to the pixel to be processed may be added as neighboring pixels and a color that outnumbers the others may be set as the neighboring pixels' color. Furthermore, eight pixels neighboring the pixel to be processed may be adopted as neighboring pixels and a color of the eight neighboring pixels that outnumbers the others may be adopted as the neighboring pixels' color.

Then the decision table is obtained (S03). Subsequently at S04 a decision is made as to whether the pixel to be processed obtained at S01 is a noise pixel for an R signal. More specifically, a decision is made for logical signal of the R signal received from AND device 307R as to whether a pixel corresponding to the pixel to be processed is determined as having a value of "1". If a decision is made that the pixel to be processed is a noise pixel the process proceeds with S05, otherwise to S07. In other words, if a decision has been made that the pixel to be processed is a noise pixel for the R signal the process proceeds with S05. At S05 a decision is made from a combination of a color of the pixel to be processed (the noise pixel) and the surrounding color obtained at S02 as to whether the pixel to be processed is a noise pixel detectable from the R signal. More specifically, the color of the pixel to be processed (the noise pixel) is set as that of a noise pixel and the surrounding color obtained at S02 is set as a background color and a decision is made as to whether the combination of the noise pixel's color and the background color is defined in the decision table as that of a color of a noise pixel corresponding to the R signal and a background color. If a decision is made that it is a detectable noise pixel then the process skips S06 and proceeds with S07, since a result provided by AND device 307R that it is a noise pixel is exactly held, or validated. If a decision is not made that it is a detectable noise pixel then after S06 the process proceeds with S07. At S06 the pixel to be processed determined at AND device 307R as a noise pixel is redetermined as a non-noise pixel. More specifically, the value of "1" corresponding to the pixel to be processed for a logical signal received from AND device 307R is changed to "0". Noise pixel can be detected with higher precision.

Subsequently at S07 a decision is made as to whether the pixel to be processed obtained at S01 is a noise pixel for a G signal. More specifically, a decision is made for logical signal of the G signal received from AND device 307G as to whether a pixel corresponding to the pixel to be processed is determined as having a value of "1". If a decision is made that the pixel to be processed is a noise pixel the process proceeds with S08, otherwise to S09. In other words, if a decision has been made that the pixel to be processed is a noise pixel for the G signal the process proceeds with S08. At S08 a decision is made from a combination of the color of the pixel to be processed (the noise pixel) and the surrounding color obtained at S02 as to whether the pixel to be processed is a noise pixel detectable from the G signal. More specifically, the color of the pixel to be processed (the noise pixel) is set as that of a noise pixel and the surrounding color obtained at S02 is set as a background color and a decision is made as to whether the combination of the noise pixel's color and the background color is defined in the decision table as that of a color of a noise pixel corresponding to the G signal and a background color. If a decision is made that it is a detectable noise pixel then the process skips S09 and proceeds with S10, since a result provided by AND device 307G that it is a noise pixel is exactly held, or validated. If a decision is not made that it is a detectable noise pixel then after S09 the process proceeds with S10. At S08 the pixel to be processed determined at AND device 307G as a noise pixel is redetermined as a non-noise pixel. More specifically, the value of "1" corresponding to the pixel to be processed for a logical signal received from AND device 307G is changed to "0". Noise pixel can be detected with higher precision.

Subsequently at S10 a decision is made as to whether the pixel to be processed obtained at S01 is a noise pixel for a B signal. More specifically, a decision is made for logical signal of the B signal received from AND device 307B as to whether a pixel corresponding to the pixel to be processed is determined as having a value of "1". If a decision is made that the pixel to be processed is a noise pixel the process proceeds with S11, otherwise to S13. In other words, if a decision has been made that the pixel to be processed is a noise pixel for the B signal the process proceeds with S11. At S11 a decision is made from a combination of the color of the pixel to be processed (the noise pixel) and the surrounding color obtained at S02 as to whether the pixel to be processed is a noise pixel detectable from the B signal. More specifically, the color of the pixel to be processed (the noise pixel) is set as that of a noise pixel and the surrounding color obtained at S02 is set as a background color and a decision is made as to whether the combination of the noise pixel's color and the background color is defined in the decision table as that of a color of a noise pixel corresponding to the B signal and a background color. If a decision is made that it is a detectable noise pixel then the process skips S12 and proceeds with S13, since a result provided by AND device 307B that it is a noise pixel is exactly held, or validated. If a decision is made that it is a detectable noise pixel then after S12 the process proceeds with S13. At S12 the pixel to be processed determined at AND device 307B as a noise pixel is redetermined as a non-noise pixel. More specifically, the value of "1" corresponding to the pixel to be processed for a logical signal received from AND device 307B is changed to "0". Noise pixel can be detected with higher precision.

Subsequently at S13 a decision is made as to whether there exists a subsequent pixel to be processed. If so then the pixel is set as a pixel to be processed and the process then returns to S01. Otherwise the process ends. Thus the decision process is effected for one line of pixels. The decision process may be performed for a plurality of lines collectively, rather than one line at a time.

While in the above description a noise pixel is a single pixel by way of example, the noise pixel may not be a single pixel and a plurality of pixels can successively be detected. This can be addressed simply by setting as a pixel that determines a background color a pixel adjacent to a cluster of a plurality of noise pixels. In doing so, at S02 a color of the pixel adjacent to the collection of the plurality of noise pixels is obtained. For example, a background color corresponding to a single pixel, that corresponding to three clustering noise pixels, and that corresponding to five clustering noise pixels may be obtained, and S04-S13 may be effected for the size of each cluster of noise pixels.

Thus the image reading apparatus 10 noise detection processor 259 extracts the first and second feature pixels from each of R, G and B signals output from the three line sensors 213R, 213G, 213B, and sets as a noise pixel the following pixels:

(1) a pixel which is extracted as a first feature pixel from an R signal and is not extracted as a second feature pixel from a G or B signal;

(2) a pixel which is extracted as a first feature pixel from a G signal and is not extracted as a second feature pixel from a R or B signal; and (3) a pixel which is extracted as a first feature pixel from a B signal and is not extracted as a second feature pixel from a R or G signal.

If the background color, the color of the pixel to be processed, and RGB signal are in a predetermined combination, image reading apparatus 10 validates only a noise pixel detected from the RGB signal. In other words, if a noise pixel's color and a neighboring pixel's color are in a predetermined combination and the noise pixel is a noise pixel detected from RGB signal determined by the combination, then the noise pixel is validated. Noise generated by dust existing on the platen can be detected with precision from an image obtained by reading an original.

Note that while in the present embodiment image reading apparatus 10 is provided with the second lightness difference detectors 302R, 302G, 302B, the apparatus may dispense with the detectors. In that case, the first lightness difference detectors 301R, 301G, 301B output to detection result extension processors 303R, 303G, 303B a logical signal representing the first feature pixel by "1" and it is extended, and a pixel which is a first feature pixel unextended for the other data is detected as a noise pixel.

Note that while the present embodiment has been described with reader 213 fixed to main body 103 by way of example, alternatively, the present invention is also applicable to moving reader 213 for scanning. For example, the upper restraint plate is of monochromatic color of white or black, and reader 213 or the source of light 206, reflector mirror 209 and reflector member 208 are moved in the sub scanning direction for scanning. During the scan, platen 205 can be oscillated in the sub scanning direction to detect dust adhering on platen 205.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising:
   at least three line sensors having corresponding filters that differ in spectral sensitivity, the at least three line sensors being arranged in a subscanning direction with a distance therebetween to scan an original in the subscanning direction and generating at least three corresponding signals based on the scanning of the original, wherein the signals of the at least three line sensors are composited together by the image reading apparatus to generate an image corresponding to the original;
   a platen arranged between a movement pathway of the original and said at least three line sensors;
   a mover moving said platen at a rate relative to said at least three line sensors, said rate being different from a movement rate of the original relative to said at least three line sensors;
   a noise pixel detector detecting a noise pixel corresponding to contamination on said platen, wherein said detecting is made based on time dependent variations between said at least three signals due to the different relative rates of movement of the platen and the original;
   a color detector detecting a color of each noise pixel from said at least three signals; and
   a determiner validating a result of detection for a noise pixel by said noise pixel detector when a color of said noise pixel and that of a pixel neighboring the noise pixel form a predetermined combination.

2. The image reading apparatus of claim 1, wherein the noise pixel detector includes an extractor configured to extract from of the at least three signals, a feature pixel having a predetermined feature located in a corresponding region and determining, for a particular location on the original, whether any of said at least three signals include the extracted feature pixel,
   wherein upon determining that one of the at least three signals includes the extracted feature pixel, the extracted feature pixel is designated as the noise pixel if it is determined that the remaining signals of the at least three signals do not include the extracted feature pixel.

3. The image reading apparatus of claim 2, wherein:
   said extractor includes a first extractor extracting from each of a plurality of data output from said at least three line sensors a first feature pixel having a predetermined feature of a first level, and a second extractor extracting from each of said plurality of data a second feature pixel having said predetermined feature of a second level; and
   said noise pixel detector compares said plurality of data corresponding to a single location on the original to detect a first feature pixel extracted from one of said plurality of data, as a noise pixel if a second feature pixel is also not extracted from each of said plurality of data other than said one of said plurality of data.

4. The image reading apparatus of claim 3, wherein said first level is higher than said second level.

5. The image reading apparatus of claim 3, wherein:
   said first extractor includes a first edge extractor employing a first filter to extract an edge region and extracts as said first feature pixel a pixel included in an edge region extracted by said first edge extractor; and
   said second extractor includes a second edge extractor employing a second filter lower in edge detection characteristic than said first filter to extract an edge region, and extracts as said second feature pixel a pixel included in an edge region extracted by said second edge extractor.

6. The image reading apparatus of claim 5, wherein said first edge extractor has a plurality of types of filters corresponding to different region sizes to output a location of a center pixel of an extracted region and a size of said extracted region.

7. The image reading apparatus of claim 3, wherein:
   said first extractor includes a first region extractor extracting a region having a limited variation in lightness and a difference from a neighboring region in lightness of at least a first threshold value, and extracts said extracted region as said first feature pixel; and
   said second extractor includes a second region extractor extracting a region having a limited variation in lightness and a difference from a neighboring region in lightness of at least a second threshold value smaller than said first threshold value, and extracts said extracted region as said second feature pixel.

8. The image reading apparatus of claim 3, wherein said second extractor further includes an extender setting as a second feature pixel a pixel neighboring said second feature pixel extracted.

9. The image reading apparatus of claim 1, further comprising an original transporter transporting the original while said at least three line sensors scan the original.

10. The image reading apparatus of claim 1, further comprising an interline corrector synchronizing at least three data output by said at least three line sensors to be values of pixels reading a single location on the original, wherein said at least three data synchronized by said interline corrector are input, one line at a time, sequentially.

11. The image reading apparatus of claim 1, further comprising a determiner depending on a variation in color from first through to second noise pixels identically located in a main scanning direction and spaced in the sub scanning direction to determine all of said first through to second noise pixels as noise pixels.

* * * * *